(12) United States Patent
Hill et al.

(10) Patent No.: US 8,226,155 B2
(45) Date of Patent: Jul. 24, 2012

(54) WORK MACHINE VEHICLE HAVING JOYSTICK CONTROLS ON AN ADJUSTABLE SUSPENDED SEATBAR

(75) Inventors: Aaron G. Hill, Forman, ND (US); Jeremy W. Ekren, Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 321 days.

(21) Appl. No.: 12/360,276

(22) Filed: Jan. 27, 2009

(65) Prior Publication Data

US 2010/0187859 A1 Jul. 29, 2010

(51) Int. Cl.
*B60R 21/02* (2006.01)
*B60K 28/04* (2006.01)

(52) U.S. Cl. ............. 296/190.01; 297/411.21; 280/748; 180/272

(58) Field of Classification Search ............. 296/190.01, 296/190.03, 190.08; 297/411.21, 411.32; 180/329, 326, 330, 331, 333, 272; 280/748
See application file for complete search history.

(56) References Cited

U.S. PATENT DOCUMENTS

| | | | |
|---|---|---|---|
| 3,640,572 A | 2/1972 | Doehler | |
| 3,861,637 A | 1/1975 | DeLongchamp | |
| 4,391,344 A | 7/1983 | Weber et al. | |
| 4,397,371 A | 8/1983 | Lynnes et al. | |
| 4,478,308 A | 10/1984 | Klaassen | |
| 4,730,691 A | 3/1988 | Grigg | |
| 5,050,700 A | 9/1991 | Kim | |
| 5,129,478 A | 7/1992 | Suenaga et al. | |
| 5,383,532 A | 1/1995 | Shonai et al. | |
| 5,470,190 A | 11/1995 | Bamford et al. | |
| 5,524,722 A | 6/1996 | Bowman et al. | |
| 5,938,237 A | 8/1999 | Abels | |
| 5,971,434 A | 10/1999 | Neufeld et al. | |
| 5,984,040 A | 11/1999 | Lee | |
| 6,296,221 B1 | 10/2001 | Nadeau | |
| 6,299,207 B1 | 10/2001 | Bares | |
| 6,425,450 B1 | 7/2002 | Lansberry | |
| 6,450,284 B1 | 9/2002 | Sakyo et al. | |
| 6,550,560 B2 | 4/2003 | Carleton | |
| 6,568,752 B1 * | 5/2003 | Lu et al. ......................... 297/42 |
| 6,732,829 B2 | 5/2004 | Bares | |
| 6,916,057 B2 | 7/2005 | Teich | |
| 2002/0074179 A1 | 6/2002 | Brandt et al. | |
| 2002/0145325 A1 | 10/2002 | Clevenger | |
| 2006/0000656 A1 | 1/2006 | Bisick et al. | |

(Continued)

FOREIGN PATENT DOCUMENTS

DE 19615591 A 10/1997

(Continued)

OTHER PUBLICATIONS

Office Action issued Sep. 1, 2010 for U.S. Appl. No. 12/360,272.

(Continued)

*Primary Examiner* — Glenn Dayoan
*Assistant Examiner* — Melissa A Black
(74) *Attorney, Agent, or Firm* — John D. Veldhuis-Kroeze; Westman, Champlin & Kelly, P.A.

(57) ABSTRACT

Disclosed are work machine vehicles having an adjustable seatbar assembly in the operator protective structure. The adjustable seatbar assembly is suspended from a seat in the operator protective structure. Vehicle controls are integrated with the adjustable seatbar assembly such that the vehicle controls and the operator sitting on the seat are maintained at constant relative positions with respect to each other even as the work machine vehicle moves over rough terrain and the seat moves up and down on a seat suspension.

14 Claims, 14 Drawing Sheets

U.S. PATENT DOCUMENTS

| | | |
|---|---|---|
| 2007/0145805 A1 | 6/2007 | Bower |
| 2007/0228712 A1* | 10/2007 | Hansen et al. ............ 280/748 |

FOREIGN PATENT DOCUMENTS

| | | |
|---|---|---|
| EP | 0445933 A1 | 2/1991 |
| EP | 1069002 A1 | 1/2001 |
| EP | 1201833 A1 | 2/2002 |
| JP | 10131235 A | 5/1998 |
| JP | 2004130828 A | 4/2004 |
| KR | 20070012909 A | 1/2007 |

OTHER PUBLICATIONS

Search Report and Written Opinion dated Jun. 28, 2010 for International application No. PCT/US2010/021611, filed Jan. 21, 2010.

Search Report and Written Opinion dated Mar. 17, 2010 for International application No. PCT/US2010/021616, filed Jan. 21, 2010.

Partial Search Report and Invitation to Pay Additional Fees dated Apr. 13, 2010 for International application No. PCT/US2010/021611, filed Jan. 21, 2010.

* cited by examiner

WORK MACHINE VEHICLE HAVING JOYSTICK CONTROLS ON AN ADJUSTABLE SUSPENDED SEATBAR

BACKGROUND

Work machine vehicles of various types are frequently operated over rough terrain. Examples of work machine vehicles include compact construction equipment and off-road construction equipment, such as skid steer loaders, compact track loaders, all-wheel steer loaders, excavators, telehandlers, and backhoe loaders. Other work machines include tractors and other agricultural equipment. Still other types of work machine vehicles exist. In many types of work machine vehicles, such as skid steer or other types of loaders, the vehicles typically include a cab or operator protective structure in which an operator seat and vehicle controls are located. Joystick vehicle controls are common in construction vehicles such as skid steer loaders. Also, seatbar safety devices are also common in work machine vehicles, to protect the operator while seated and operating the vehicle.

Operator seats are typically allowed to move on a suspension as the vehicle travels over uneven terrain during operation. Commonly, the joystick or other vehicle controls are mounted in the cab, such that movement of the operator seat on the suspension results in movement of the operator relative to the vehicle controls. The fact that the operator seat (and thus the operator) moves relative to the vehicle controls increases the difficulty for the operator in controlling the vehicle operation, particularly over rough terrain. In addition to the increased difficulty of controlling the vehicle in these situations, operator comfort is also negatively impacted.

The discussion above is merely provided for general background information and is not intended to be used as an aid in determining the scope of the claimed subject matter.

SUMMARY

Disclosed are work machine vehicles having an adjustable seatbar assembly in the operator protective structure. The adjustable seatbar assembly is suspended from a seat in the operator protective structure. Vehicle controls are integrated with the adjustable seatbar assembly such that the vehicle controls and the operator sitting on the seat are maintained at constant relative positions with respect to each other even as the work machine vehicle moves over rough terrain and the seat moves up and down on a seat suspension.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Disclosed are embodiments of adjustable seatbar assemblies which suspend from the seat of a work machine vehicle. Work machine vehicles include, but are not limited to compact construction equipment and off-road construction equipment, such as skid steer loaders, compact track loaders, all-wheel steer loaders, excavators, telehandlers, and backhoe loaders. Other work machines include tractors and other agricultural equipment. Still other types of work machine vehicles exist. Integrated joystick controls are positioned on the adjustable seatbar assemblies, thus allowing adjustment of the joystick control positions (via adjustment of the seatbar position) relative to a position of a user and the seat. These embodiments allow the joystick controls to be adjusted for particular operators of a work machine vehicle. These embodiments also allow the joystick controls on the seatbar and the operator to be maintained at constant relative positions as the vehicle moves over rough terrain and the seat moves up and down on its suspension.

Figure 1:
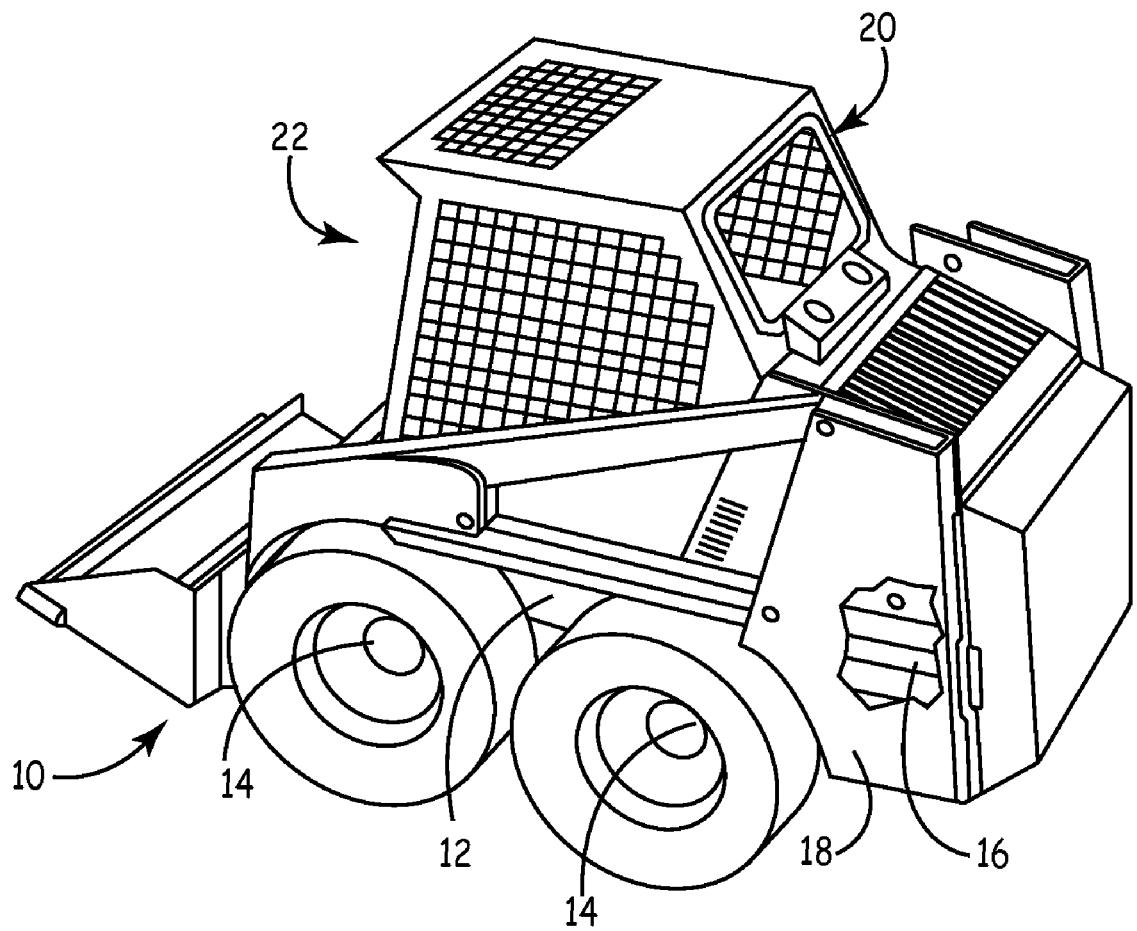
FIG. 1 is a perspective view of a typical skid steer loader representing various types of work machine vehicles fitted with joystick controls mounted on an adjustable seatbar in accordance with disclosed embodiments.

FIG. 1 depicts a work machine vehicle 10 in the form of a skid steer loader. Though illustrated in the form of a skid steer loader, vehicle 10 need not be a skid steer loader in all embodiments, but rather can be other types of compact construction equipment. The skid steer loader depicted in FIG. 1 includes a frame 12, mounted on wheels 14 that are driven through a suitable power train, such as hydraulic motors that in turn are driven from pumps. The pumps are driven from an engine 16 mounted in an engine compartment 18 that is to the rear of an operator's cab or enclosure 20, which is also referred to as an operator protective structure. The operator's cab 20 is entered and exited from the front indicated at 22, in this embodiment.

Figure 2:
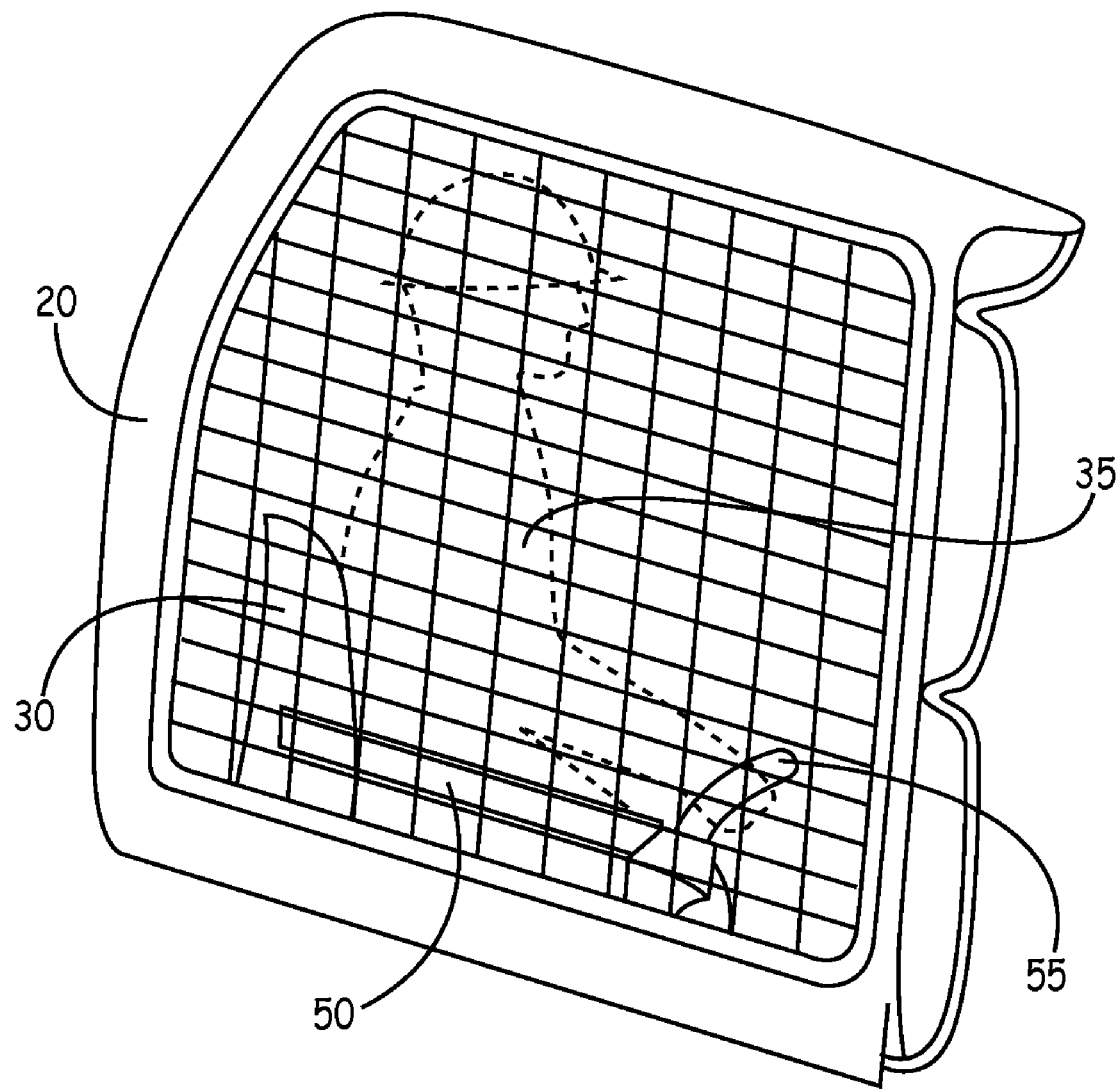
FIG. 2 is a diagrammatic side view illustration of a cab or operator protective structure having joystick controls mounted on an adjustable seatbar.

FIG. 2 depicts an example embodiment of operator cab 20. Positioned within operator cab 20 is a seat 30 on which an operator sits while controlling operations of the vehicle 10.

An adjustable seatbar assembly 50 is suspended from seat 30. Joystick controls 55 are integrated with or attached to seatbar assembly 50. Adjustment of seatbar assembly 50 then provides adjustment of controls 55 relative to operator 35 and seat 30. As seat 30 moves up and down on its suspension (not shown), seatbar assembly 50 and controls 55 move with the seat. Thereby, a substantially constant relative position of the joystick controls relative to the operator can be maintained, even as the vehicle moves over rough terrain.

Figure 3:
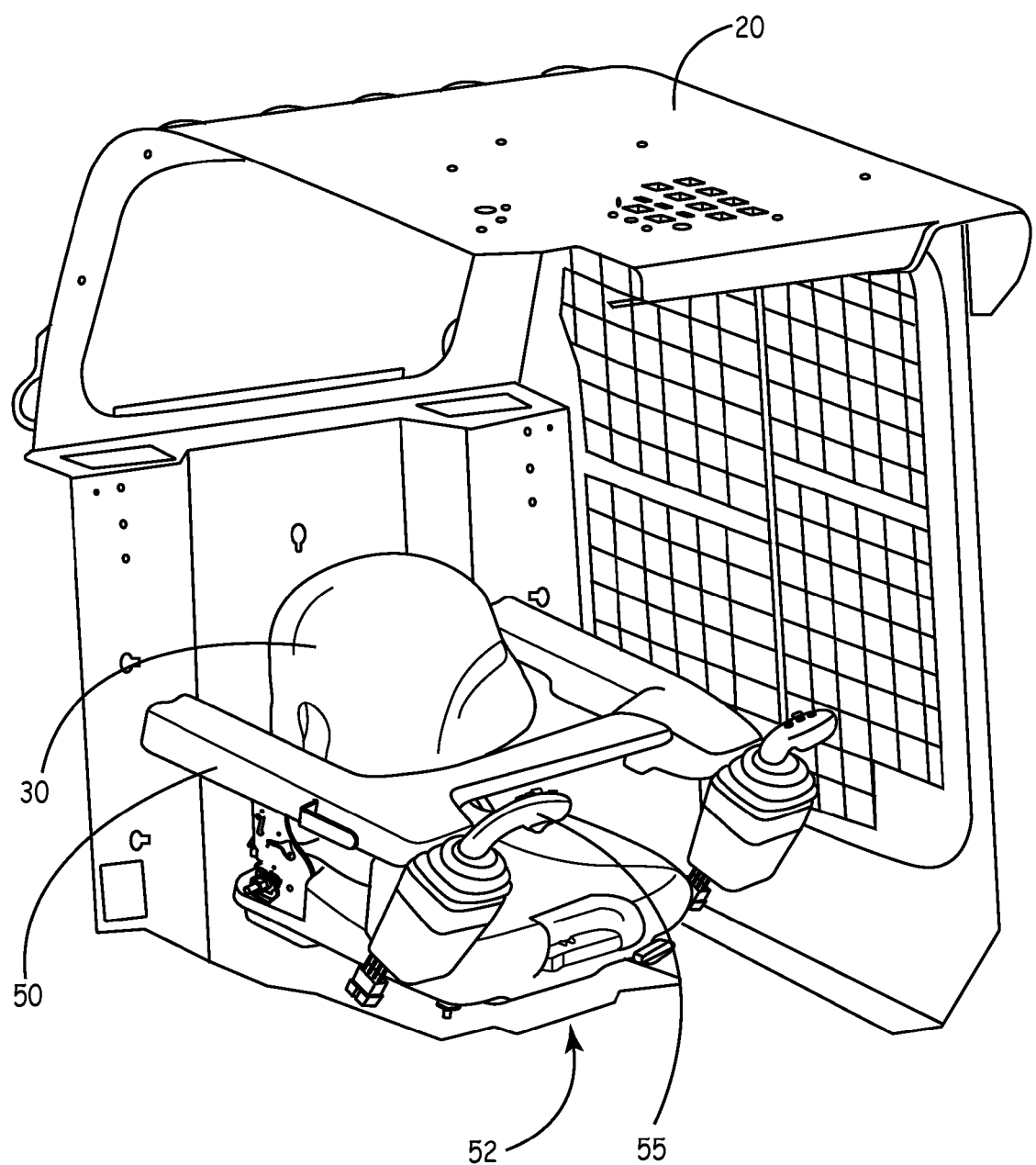
FIG. 3 is a perspective view of portions of the cab, showing the joystick controls mounted on an adjustable seatbar in greater detail.

Referring now to FIG. 3, shown is a first embodiment of the adjustable seatbar assembly 50 illustrated in FIG. 2. As in FIG. 2, adjustable seatbar assembly 50 is physically coupled to and supported by the structure of seat 30. By suspending seatbar assembly 50 from seat 30, joystick controls 55 move in conjunction with movement of suspension 52, which is diagrammatically represented in FIG. 3, but is not shown in detail.

Figure 4:
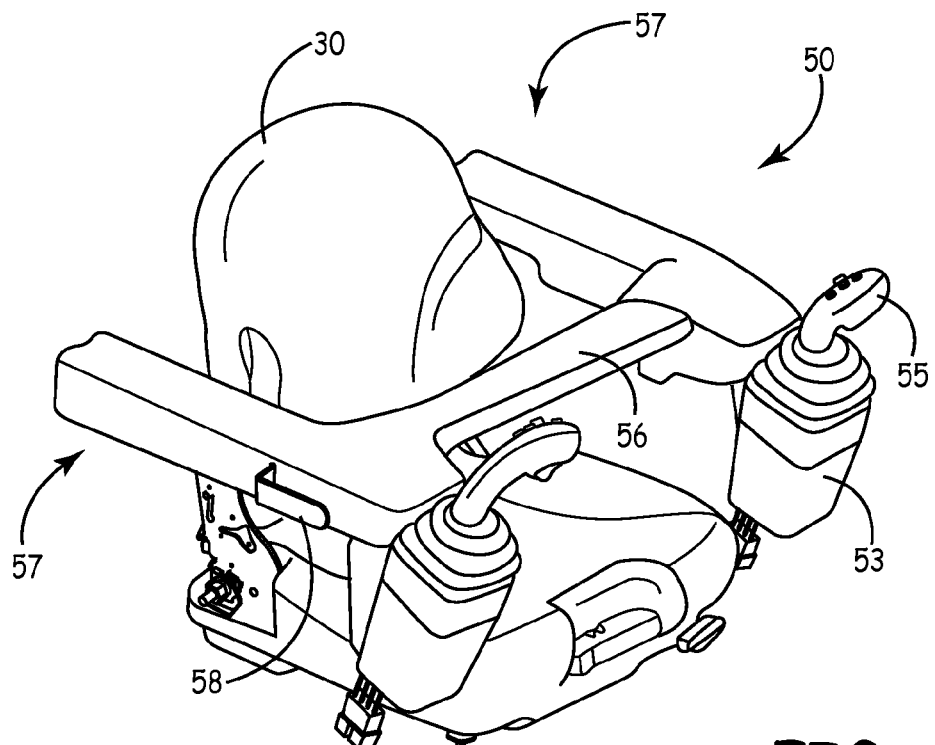
FIG. 4 is a perspective view of a first embodiment of an adjustable seatbar and joystick controls arrangement.
Figure 5:
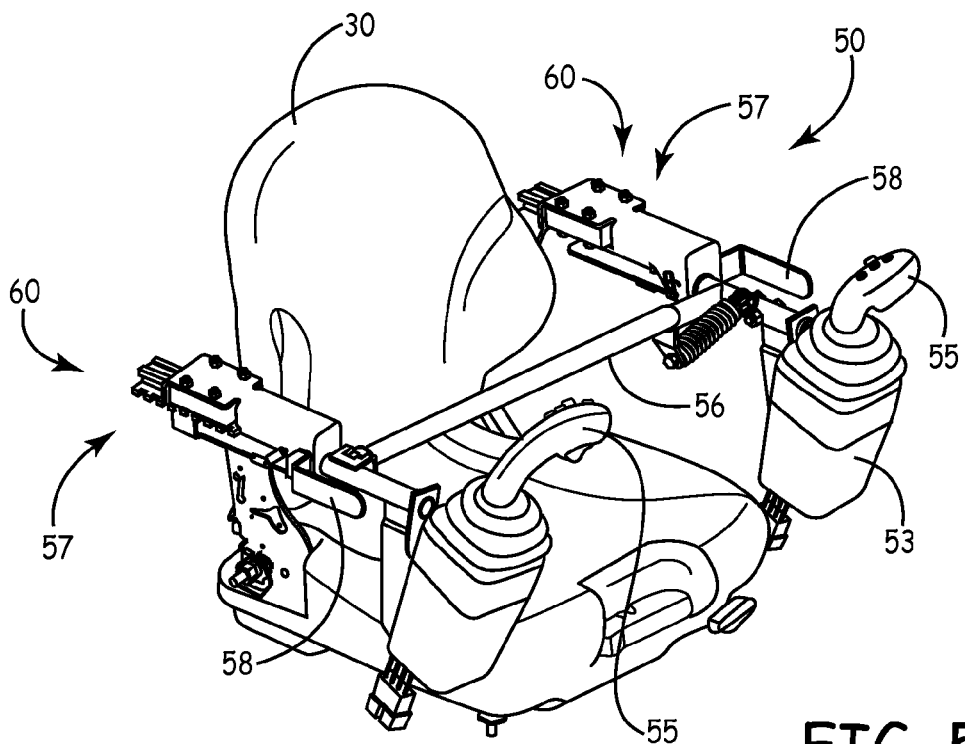
FIG. 5 is a perspective view of the adjustable seatbar and joystick controls arrangement shown in FIG. 4, but with a seatbar cover removed.

Referring now to FIGS. 4 and 5, shown are perspective views of the adjustable seatbar assembly 50. Cab 20 is not shown. FIG. 4 illustrates seatbar assembly 50 with an overmolded foam 54 covering seatbar 56 and armrests 57, both of which form portions of the seatbar assembly. FIG. 5 illustrates seatbar 50 with the bumper removed for illustrative purposes. As shown in these FIGS., joystick covers 53 aid in housing joystick controls 55 and mounting these controls onto the seatbar assembly. Although electrical connectors for controls 55 are exposed below covers 53 for illustrative purposes, in typical implementations these connectors can be recessed within covers 53 or other portions of the seatbar assembly in order to protect the connectors and wires from accidental contact, wear and tear, harsh environments, etc. In FIGS. 4 and 5, a slide release lever 58 is shown on both of the right and left hand sides of seatbar assembly, adjacent to the armrests 57. Slide release levers 58 control seatbar slide mechanisms 60 to allow seatbar assembly 50 to slide toward and away from the seatback and operator in order to properly position controls 55 for the particular operator's size and/or comfort preferences.

Figure 6:
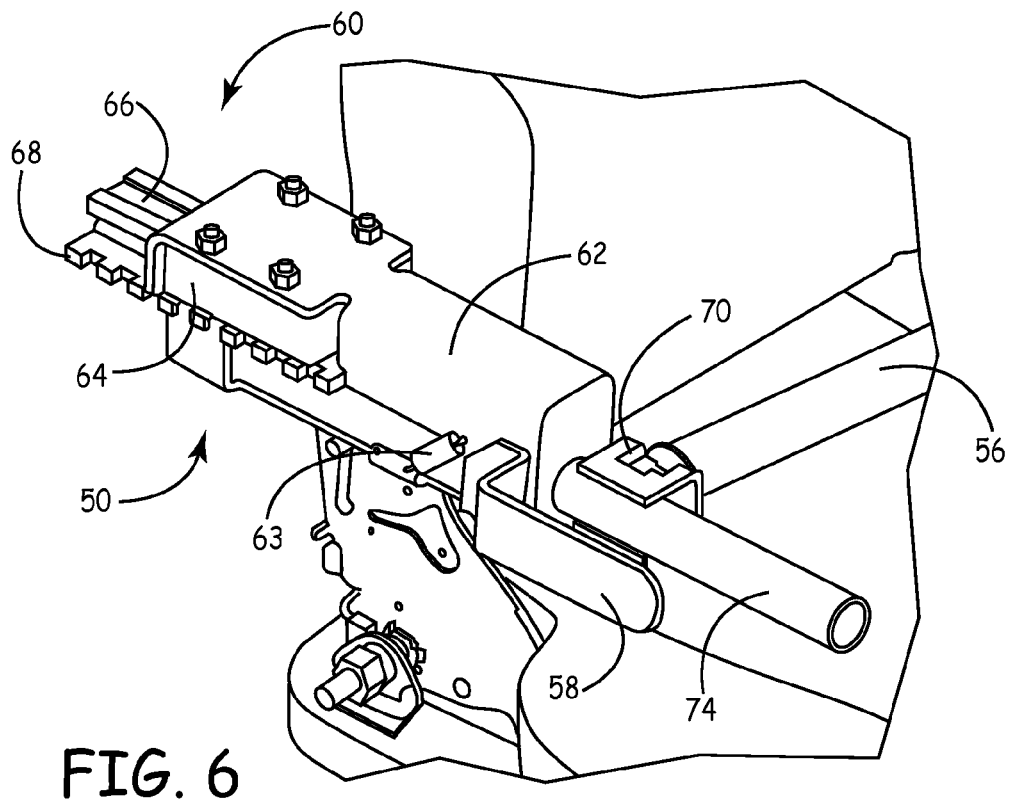
FIG. 6 illustrates example components on a right hand side of the adjustable seatbar arrangement shown in FIGS. 4 and 5.
Figure 7:
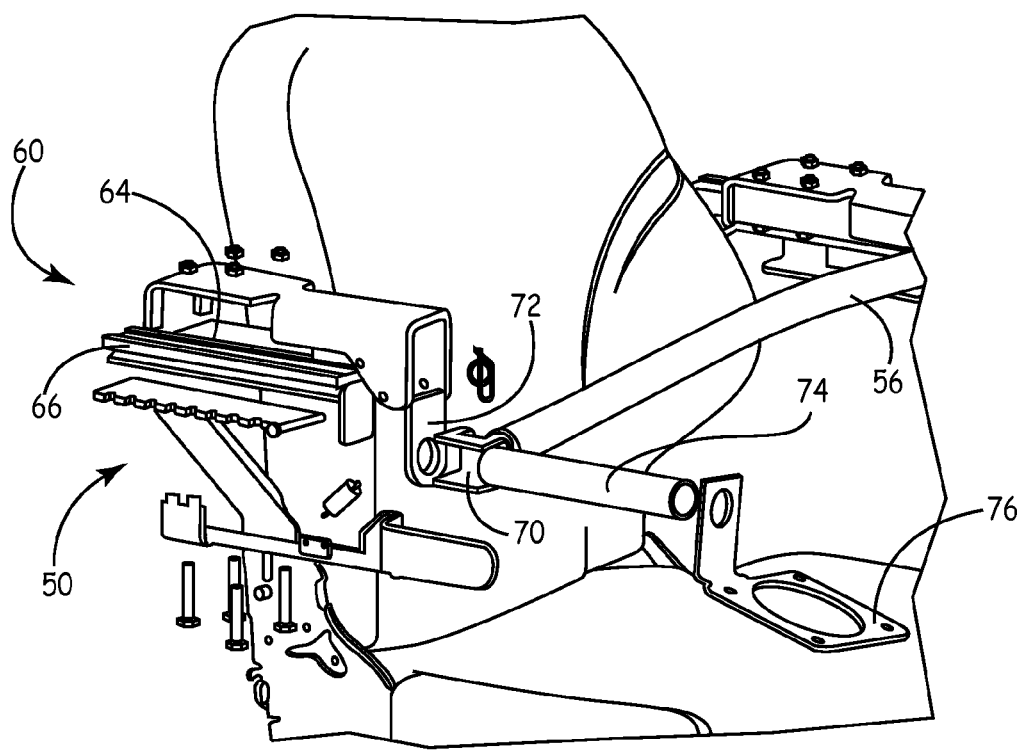
FIG. 7 is a partially exploded view illustrating example components on the right hand side of the adjustable seatbar arrangement shown in FIGS. 4 and 5.

Referring to FIGS. 6 and 7, portions of seatbar assembly 50, including slide mechanism 60, on the right hand side of the seat are shown in greater detail. Slide release handle or lever 58 bolts to an upper frame 62. A spring 63 between the two holds the handle in a detent position unless the handle is moved under force by the operator in order to slide the seatbar 56 relative to the operator. The upper frame 62 bolts to a slide block 64, which can be a machined aluminum piece having a low friction plastic insert to allow the sliding motion. A slide rail 66, which can be for example a highly polished extruded aluminum piece, provides for a low friction interface with the plastic inserts of the slide block, allowing the upper frame 62 to slide relative to the rail 66. Since seatbar 56 is physically securable to upper frame 62, this provides fore and aft adjustment of seatbar 56 relative to the operator or seatback. To move to a desired position, the operator applies force to slide release handle 58 to disengage the handle from detents on a lower frame portion 68. When in the desired position, the operator allows the bias spring 63 to return the slide release handle 58 back into engagement with one of the detent positions of lower frame 68, thus preventing further fore and aft movement of the seatbar. While an example of a particular slide mechanism is shown for illustrative purposes, those of skill in the art will understand that other types of slide mechanisms can be used, and that the claims appended hereto are not limited to this particular type of slide mechanism.

A plate 72 is welded or otherwise fixedly secured to upper frame 62, and a joystick mount tube 74 is welded to or otherwise secured to the plate 72. A seatbar latch 70 connects to the mount tube 74 to control an upward hinged rotational movement of the seatbar frame 56. As will be shown in FIGS. 8 and 9, seatbar frame 56 is pivotally connected on the operator's left hand side so that the seatbar can be rotated up to allow the operator to be seated or to exit the seat, and so that once seated the seatbar can be rotated back down into engagement with latch 70. A joystick mount 76 is welded or otherwise secured to joystick mount tube 74. Joystick mount 76 supports the joystick controls 55 (not shown in FIGS. 6 and 7) in order to suspend the controls from the seatbar assembly and to thereby allow adjustment of the controls relative to the operator, and in order to allow the controls to move in conjunction with movement of the operator and seat while the vehicle moves over terrain.

Figure 8:
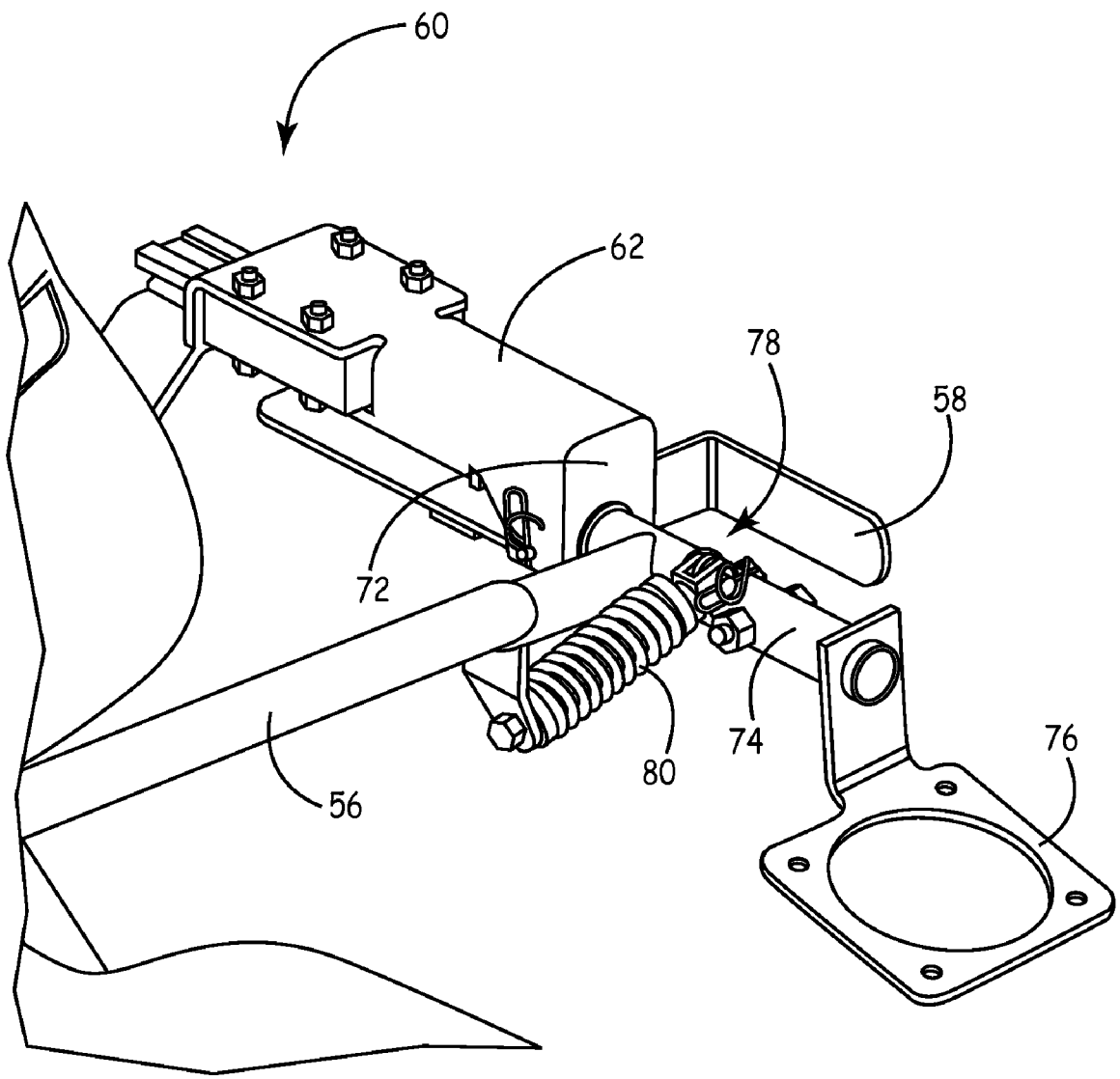
FIG. 8 illustrates example components on a left hand side of the adjustable seatbar arrangement shown in FIGS. 4 and 5.
Figure 9:
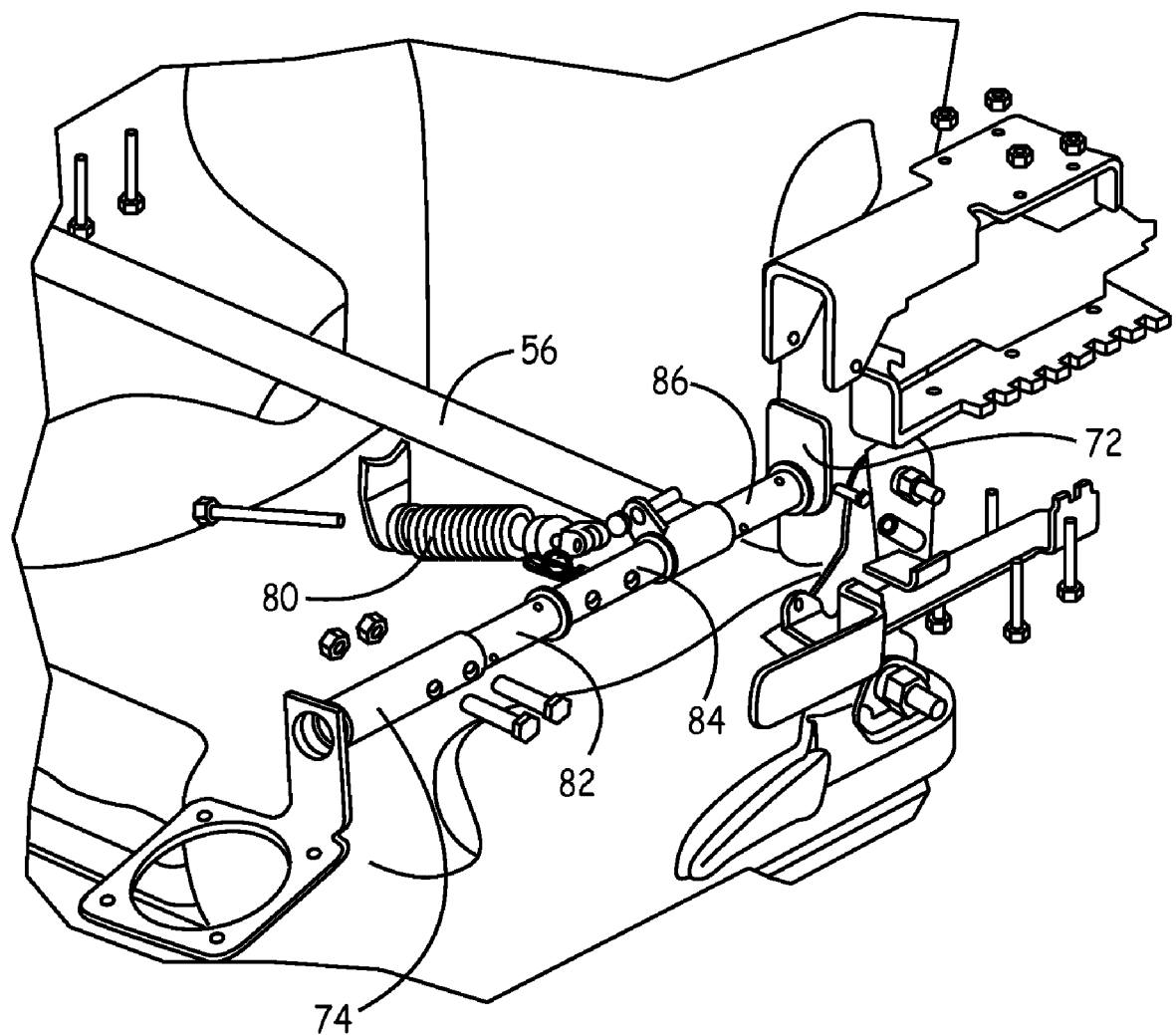
FIG. 9 is a partially exploded view illustrating example components on a left hand side of the adjustable seatbar arrangement shown in FIGS. 4 and 5.

Referring now to FIGS. 8 and 9, portions of seatbar assembly 50 on the left hand side of the seat are shown in greater detail. Like the right hand side, the left hand side of seatbar assembly 50 includes a slide mechanism 60 which can be of the same or similar construction as slide mechanism 60 described above, though in FIG. 9 only upper frame 62 and slide release handle 58 are labeled. The slide mechanisms on the left and right hand sides allow each of these sides of the seat bar assembly to be adjusted in the fore and aft directions individually.

Unlike the right hand side, on the left hand side of seatbar assembly 50, a pivot mechanism 78 is provided to allow seatbar frame 56 to pivot up (or down) from the right hand side relative to the left hand side. As on the right hand side, the left hand side includes a joystick mount 76 welded or otherwise attached to a joystick mount tube 74. A pivot bushing 82 (shown rotated 90° from actual) is inserted into the joystick mount tube 74. The pivot bushing 82 slides over a pivot frame 84, which is welded or attached to plate 72. The joystick mount tube 74, pivot bushing 82 and pivot frame 84 are then bolted or otherwise secured together. Another bushing 86 retains a pivot collar 88 which is formed on or attached to the end of the seat bar frame 56. An over-center spring mechanism 80 asserts a downward force of seatbar frame 56 until an operator has lifted the seatbar frame past an over-center position, at which time the spring mechanism aids in lifting the seatbar frame. The operator can then enter or exit the seat area. When the operator asserts a force to lower the seatbar frame, the over-center spring aids in lowering once the over-center position is passed. When raising or lowering the seatbar frame, the joystick mounts 76, and thus the joystick controls 55, remain in place and are not raised or lowered.

It should be understood that seatbar assembly 50 need not be constructed exactly as shown in the above-referenced FIGS. For example, if desired, the left and right hand sides can be configured to slide together instead of separately. Further, the seatbar frame need not pivot about the left hand side, as a right hand side pivoting configuration would be constructed using the same concepts.

Figure 10:
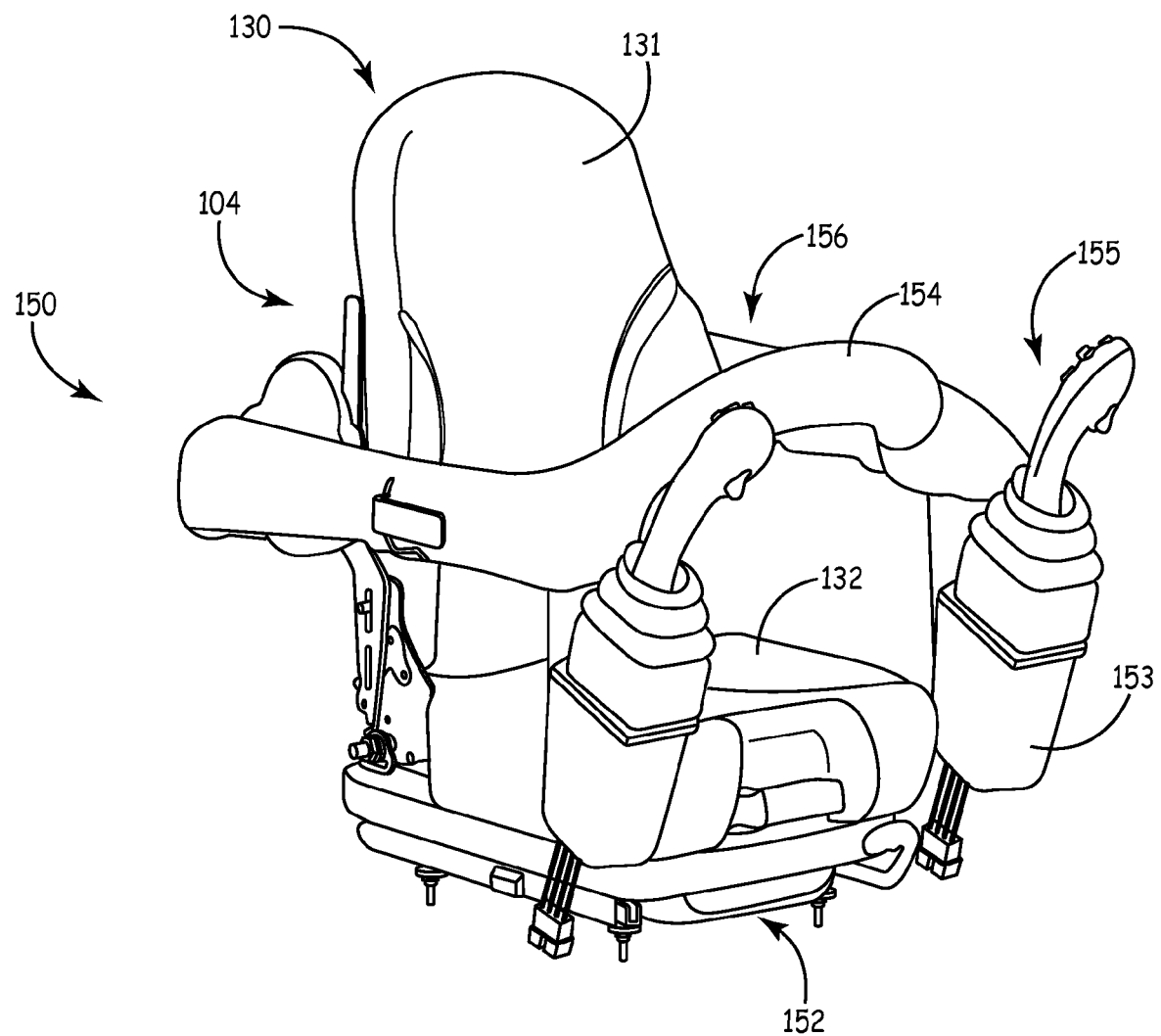
FIGS. 10 and 11 are perspective and right hand side views, respectively, of a second embodiment of an adjustable seatbar and joystick controls arrangement.
Figure 11:
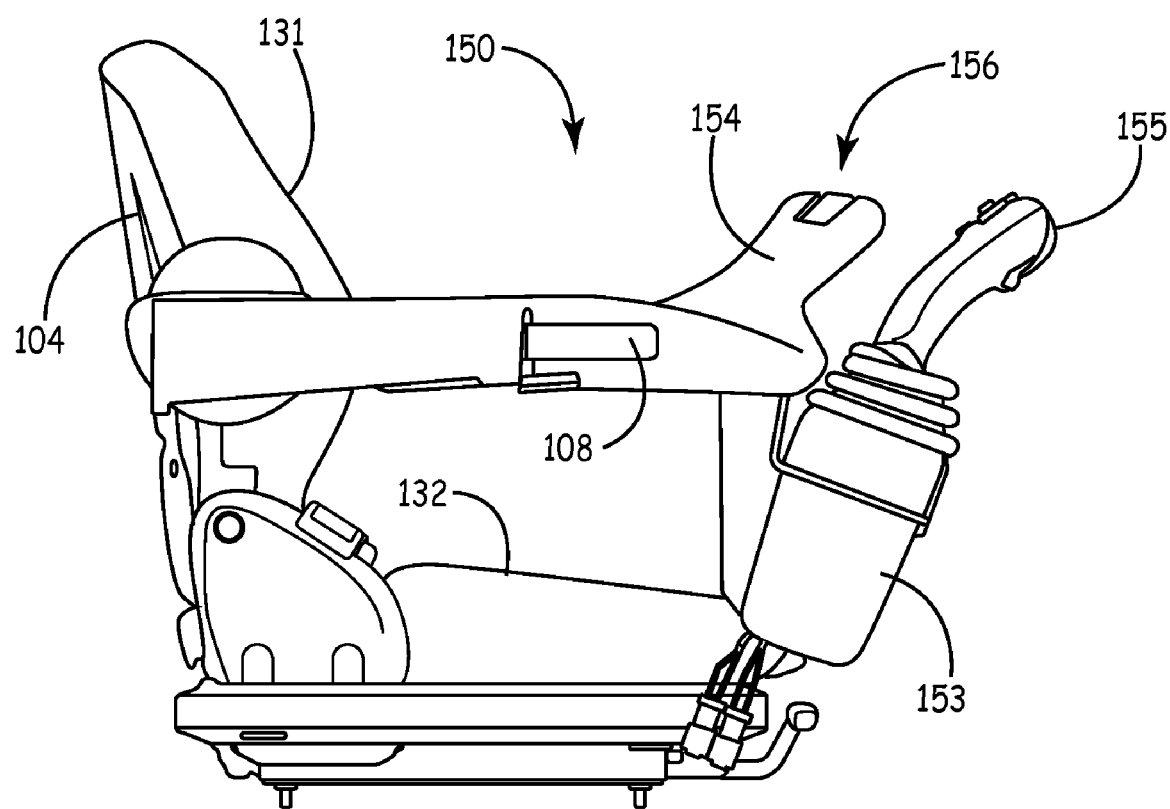

Referring now to FIGS. 10 and 11, shown are a perspective view and a side view respectively of a second adjustable seatbar assembly embodiment 150 with controls mounted on, or in a fixed relative position to, the seatbar 156 to facilitate adjustment of the controls 155 relative to the operator 35 (see FIG. 2) and seat 130. Although not illustrated in a vehicle, those of skill in the art will recognize that seatbar assembly embodiment 150 can replace seatbar assembly embodiment 50 in FIGS. 1-3, for example. Seatbar 156 is shown in FIG. 10 with a bumper or pad 154 covering seatbar 156. Seatbar assembly 150 also moves up and down in conjunction with up and down movement of seat 130 on a suspension (represented generally at 152 but not shown in detail) as the vehicle 10 moves over terrain. This maintains the constant relative positioning of controls 155, mounted in covers 153, relative to the operator and seat as was the case with adjustable seatbar assembly embodiment 50 described above.

As shown in FIG. 10, seatbar assembly 150 includes a slider handle 108 which controls a slide assembly to accomplish fore and aft adjustment of the seatbar, and thus allows movement of controls 155 closer to, or further away from, the seatback 131 of seat 130 (and thus relative to the operator). A pivot handle 104 controls a pivot assembly which pivots the seat bar and thus the controls 155 about a pivot point to move the seat bar and controls rotationally up and down relative to the seat cushion 132 (and thus the operator).

Figure 12:
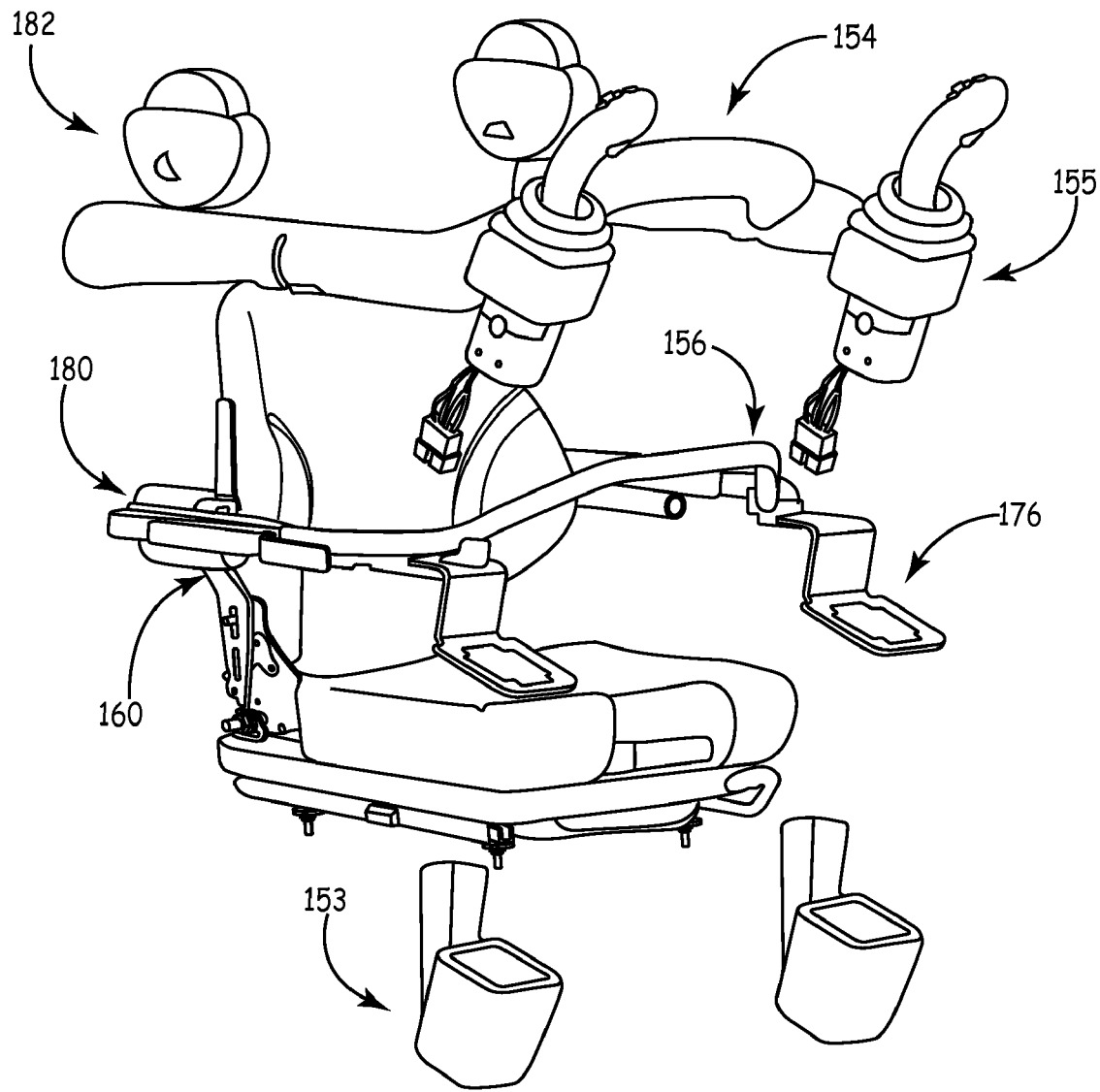
FIGS. 12 and 13 are partially exploded perspective views of the adjustable seatbar and joystick controls arrangement shown in FIGS. 10 and 11.

Referring now to FIG. 12, the seat and seatbar assembly 150 are shown in greater detail in a partially exploded perspective view. In this view, seatbar cover 154 is moved to illustrate seatbar frame 156. Joystick control mount brackets 176, to which joystick covers 153 attach to support joysticks 155, are shown suspended from seatbar frame 156. Also shown in FIG. 12 are a slider mechanism 160 and a pivot mechanism 180. Pivot mechanism covers 182 are also shown in an exploded format so that pivot mechanism 180 can be seen. Under the control of slide release handle 108 (reference numbers shown in FIGS. 10 and 11), the seatbar can be adjusted fore and aft relative to the seatback and to the operator in order to adjust the seatbar and joystick controls positions relative to the operator. Under the control of pivot handle 104 (reference numbers shown in FIGS. 10 and 11), the seatbar can be adjusted rotationally upward or downward relative to the seat cushion and/or to the operator in order to allow the operator access to enter and exit the seat area, and in order to adjust the seatbar and joystick controls positions relative to the operator.

Figure 13:
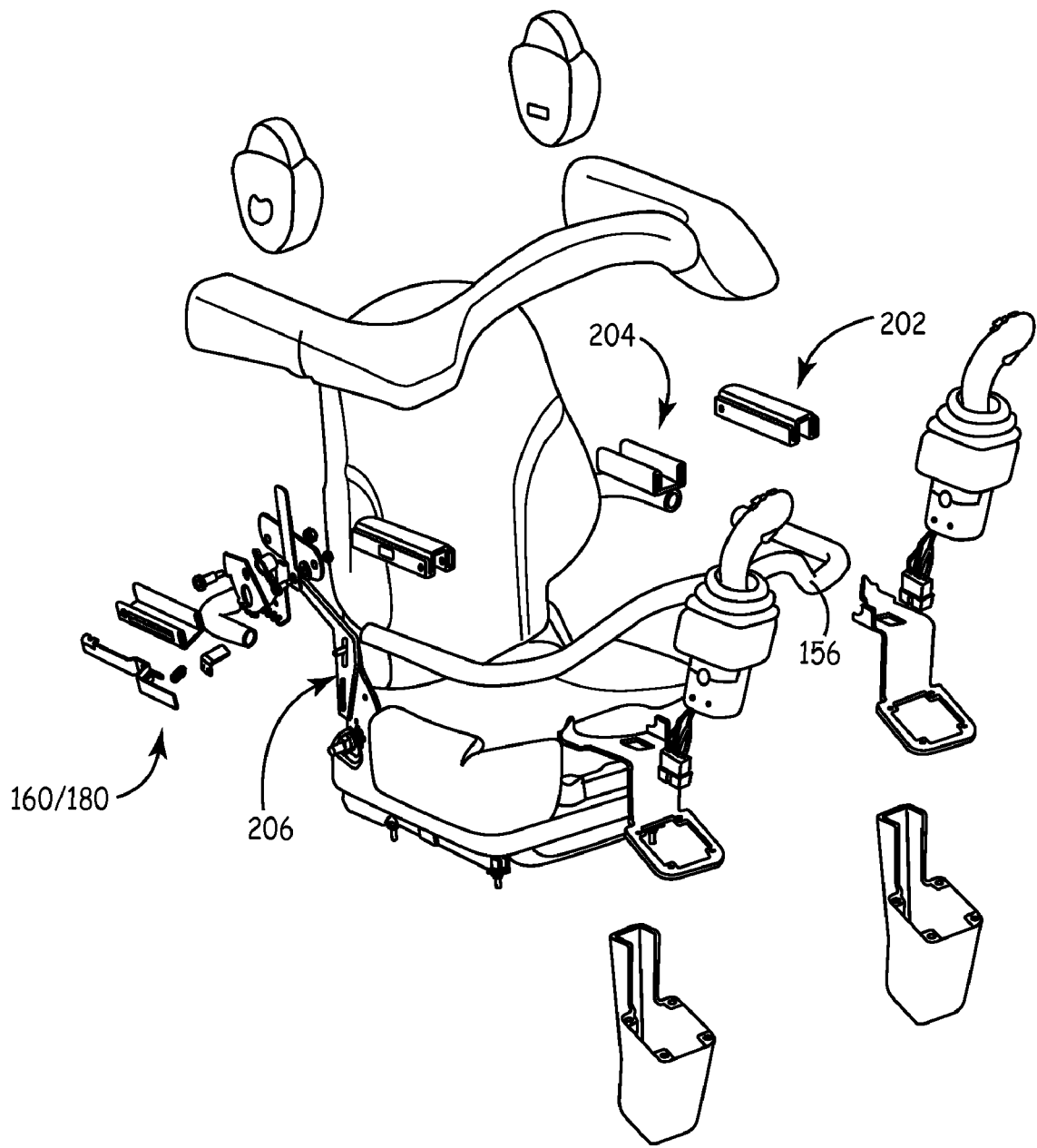

Referring now to FIG. 13, additional seat bar components of seatbar assembly 150 are shown in an exploded view. An upper slide rail 202 is welded to the seat bar metal frame 156. An assembly mount bracket 206 is also welded to the frame. A lower slide rail 204 is attached to the seat via its being welded or otherwise secured to the slide mount structure member 232 shown in FIG. 14. The frame 156 is sandwiched between the upper and lower slide rails, and the slide rails slide relative to one another to allow fore and aft adjustment of the seatbar 156 and controls 155. The slide rails are duplicated on each of the left and right hand sides, but in the illustrated embodiment, detents are only included on the right hand side. Of course, left hand side detents could be used instead.

Figure 14:
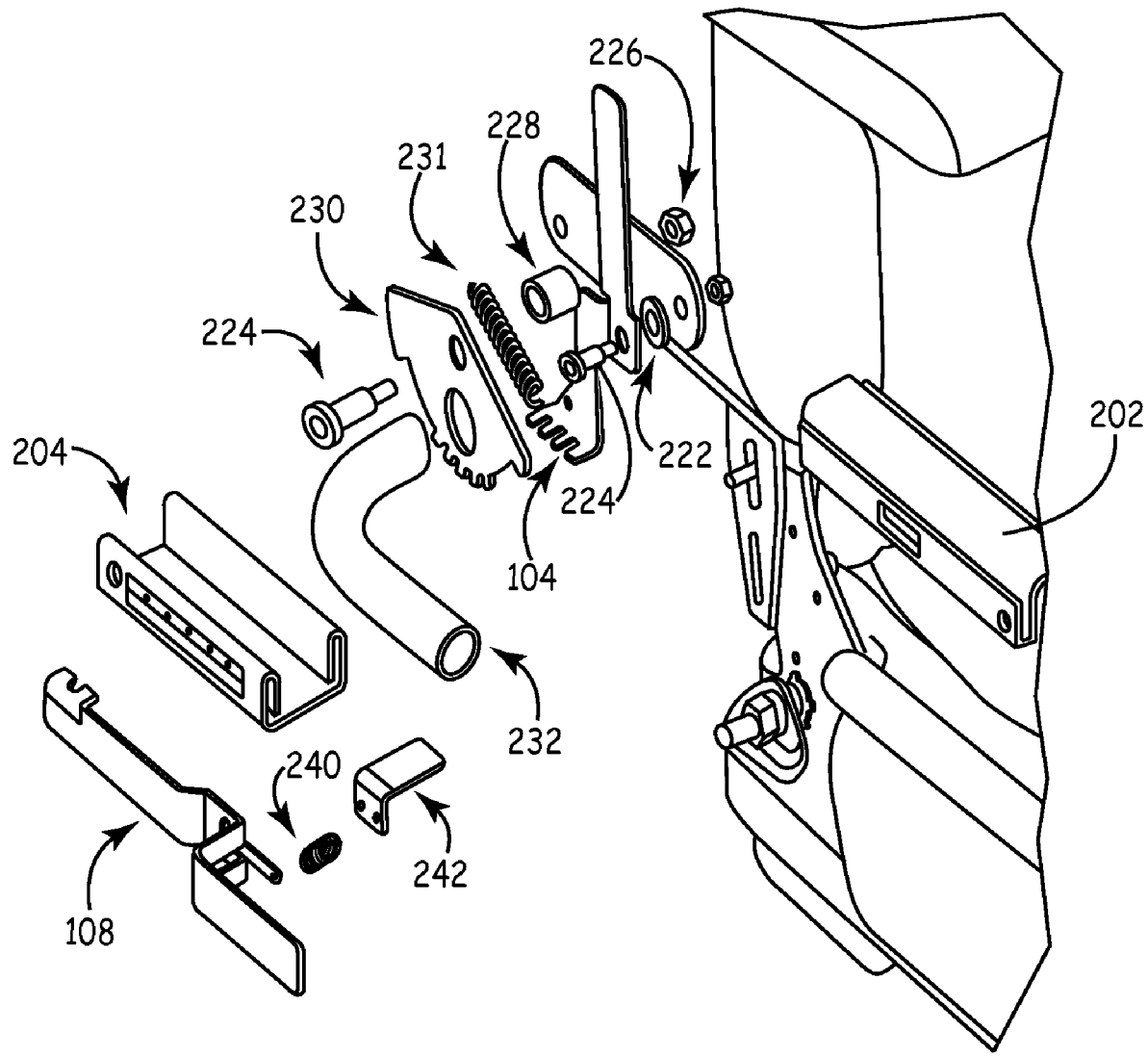
FIG. 14 is an exploded perspective view illustrating example components on a right hand side of the adjustable seatbar arrangement shown in FIGS. 10 and 11.
Figure 15:
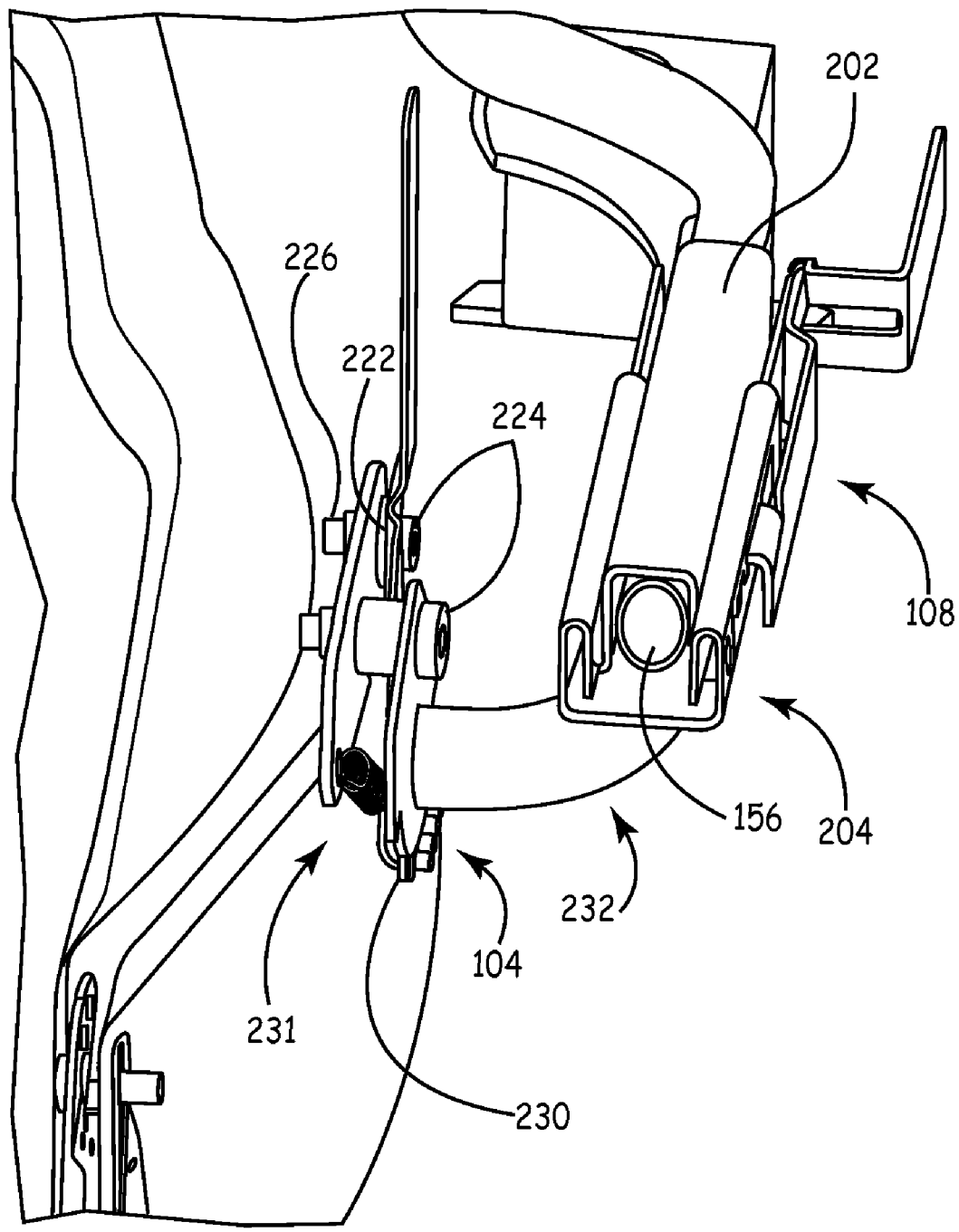
FIG. 15 is a rear view illustrating example components on the right hand side of the adjustable seatbar arrangement shown in FIGS. 10 and 11.
Figure 16:
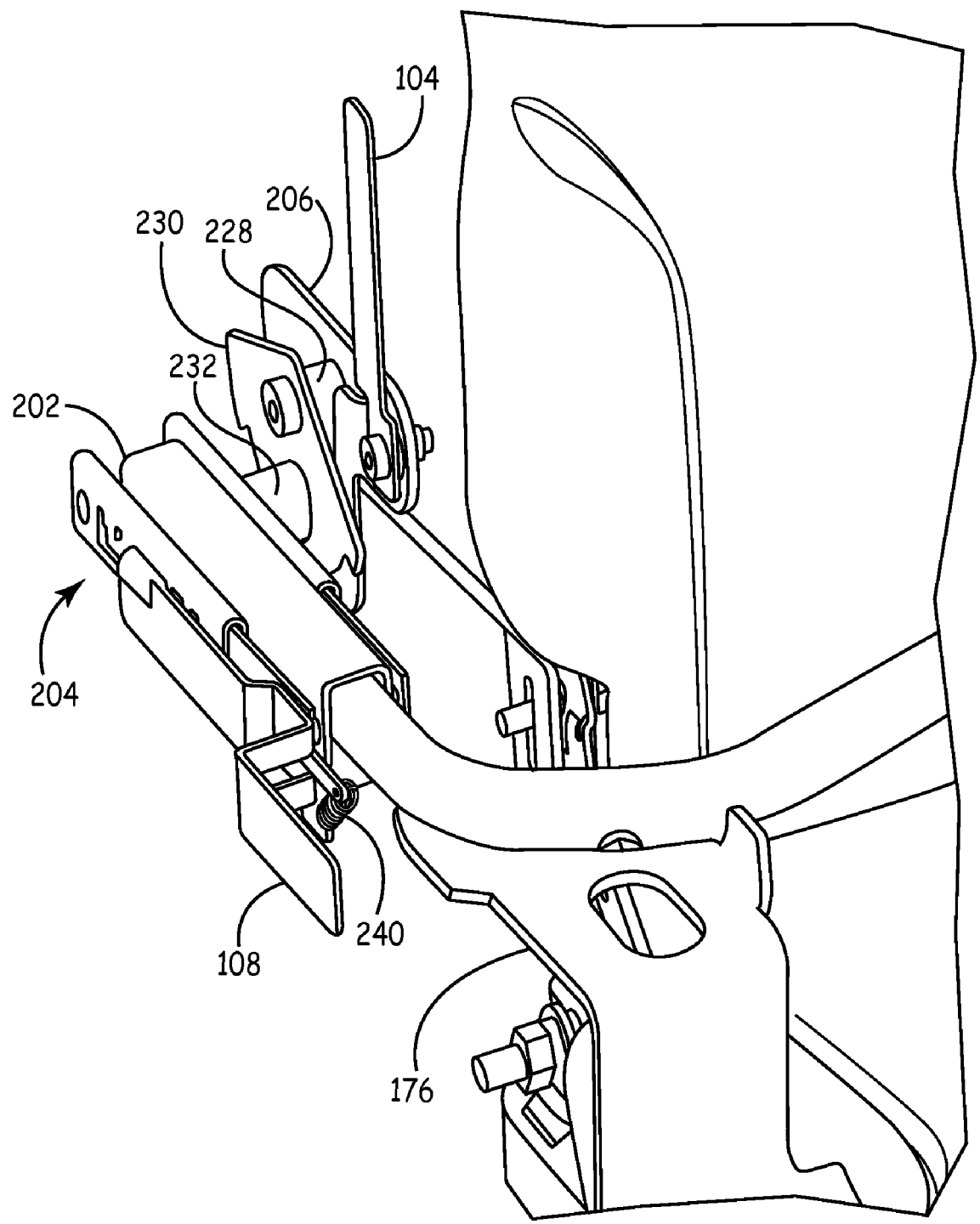
FIG. 16 is a front perspective view illustrating example components on the right hand side of the adjustable seatbar arrangement shown in FIGS. 10 and 11.

Referring now to FIG. 14, certain components of pivot mechanism 180 and slider mechanism 160 are shown in greater detail. FIG. 15 shows a rear unexploded view of these components. FIG. 16 shows a front unexploded view of these components. The pivot release lever 104 bolts to the assembly mount bracket 206 with a spacer washer 222, a carriage bolt 224 and a retainer nut 226. A spacer bushing 228, another carriage bolt 224 and another nut 226 attach the detent plate 230 to the pivot release lever 104. The pivot detent structure is also welded to a slider mount structure 232. The lower slide rail 204 is in turn welded to the slider mount structure 232.

The upper slide rail 202, the seatbar frame 156 and the joystick mount bracket 176 form another welded or coupled structure. The lower and upper slide rails 204 and 202 fit together to allow one to slide relative to the other. The slider release lever 104 is bolted to the upper slide rail 202. A slider lever spring 240 and a slider spring bracket 242 maintain the slider mechanism in a normally locked position. The operator can then pull the slider release lever up to release the rails to slide relative to each other to move the seat bar relative to the seat and the operator. When the lever 108 is in the down position, the rails are locked from sliding relative to one another.

For the pivot release mechanism, lever 104 is pushed or rotated rearward from the seat to release the pivot mechanism 180 to allow the seatbar to pivot upward or downward to adjust the seat bar relative to the seat and the user. The pivot release mechanism 104 is normally biased in a forward or locked position by pivot spring 231. The pivot detent plate 230 has a number (e.g., six) of pivot stops, each of which corresponds to a different pivot detent positions of the seat bar.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, in various embodiments, the seatbar slide and or pivot mechanisms can be implemented using other components than those shown in the example embodiments. Also, different component shapes, materials, attachment mechanisms, slide mechanisms, pivot mechanisms, etc., can be used to implement the disclosed concepts. Other examples of modifications of the disclosed concepts are also possible, without departing from the scope of the disclosed concepts.

What is claimed is:

1. A work machine vehicle comprising:
    an operator protective structure;
    a seat positioned in the operator protective structure; and
    an adjustable seatbar assembly suspended from the seat, the adjustable seatbar assembly including:
        first and second armrests pivotally coupled to the seat about first and second locations on opposing sides of the seat to allow for selectable adjustment of an operating position of the first and second armrests; and
        a seatbar positionable in front of an operator sitting on the seat, the seatbar being pivotally coupled to the first armrest and releasably attachable to the second arm rest.

2. The work machine vehicle of claim 1, wherein the adjustable seatbar assembly comprises a slide mechanism which selectively allows fore and aft adjustment of the first armrest relative to the operator.

3. The work machine vehicle of claim 1, wherein the adjustable seatbar assembly further comprises a latch mechanism on the second arm rest to selectively secure the seatbar to the second arm rest.

4. The work machine vehicle of claim 1, and further comprising an over-center spring mechanism coupled to the seatbar to provide bias forces to aid in pivoting the seatbar.

5. The work machine of claim 1, wherein the seat has a suspension so that the seat can move up and down and wherein the work machine vehicle further comprises:
    vehicle controls integrated with the adjustable seatbar assembly such that the vehicle controls and the operator sitting on the seat are maintained at constant relative positions when the seat moves up and down.

6. The work machine vehicle of claim 5, wherein the vehicle controls comprise joystick vehicle controls, and wherein the adjustable seatbar assembly further comprises a joystick mount supporting the joystick vehicle controls to maintain the constant relative positions between the joystick vehicle controls and the operator with respect to each other as the work machine vehicle moves over rough terrain and the seat moves up and down.

7. The work machine of claim 1 and further comprising a pivoting mechanism for coupling the first armrest to the seat, the pivoting mechanism including an actuation device configured to allow for selection of one of a plurality of rotational operating positions.

8. A work machine vehicle comprising:
- an operator protective structure;
- a seat positioned in the operator protective structure, the seat having a seatback portion and a seat cushion portion, the seat being allowed to move up and down on a seat suspension;
- a seatbar assembly pivotally suspended from the seat at first and second positions and rotatably positionable about an axis that extends from a first side to a second side of the seat in front of an operator sitting on the seat into a plurality of operable positions; and
- vehicle controls coupled to and suspended from the seatbar so that the vehicle controls move with the seatbar when the seatbar is pivoted relative to the seat.

9. The work machine vehicle of claim 8, wherein the adjustable seatbar assembly comprises a first slide mechanism which selectively allows fore and aft adjustment of the seatbar and vehicle controls relative to the seatback.

10. The work machine vehicle of claim 9, wherein the adjustable seatbar assembly comprises a second slide mechanism, the first and second slide mechanisms being positioned respectively on left and right hand sides of the seat to independently allow fore and aft adjustment of the seatbar and the vehicle controls relative to the seatback.

11. The work machine vehicle of claim 8, wherein the seatbar is configured to be pivotable toward the seatback to allow an operator to enter or exit the seat, and wherein the seatbar further includes a pivot adjustment mechanism to selectively allow the vehicle controls to be vertically adjusted relative to the operator when the operator is seated in the seat.

12. The work machine vehicle of claim 8, wherein the vehicle comprises a loader.

13. The work machine vehicle of claim 8, wherein the seatbar assembly includes a seatbar, the seat bar being pivotally attached to the seat at the first and second locations.

14. The work machine vehicle of claim 8, wherein the seatbar is slidingly adjustable with respect to the seat in a direction other than movement accomplished by rotating the seatbar about the pivotal suspension to the seat.

* * * * *

UNITED STATES PATENT AND TRADEMARK OFFICE
CERTIFICATE OF CORRECTION

| | | |
|---|---|---|
| PATENT NO. | : 8,226,155 B2 | Page 1 of 1 |
| APPLICATION NO. | : 12/360276 | |
| DATED | : July 24, 2012 | |
| INVENTOR(S) | : Hill et al. | |

It is certified that error appears in the above-identified patent and that said Letters Patent is hereby corrected as shown below:

Column 6,

Line 48, delete "arm rest" and insert --armrest--.

Line 49, delete "arm rest" and insert --armrest--.

Column 7,

Line 23, delete "seatback" and insert --seatback portion--.

Column 8,

Line 4, delete "left and right hand" and insert --first and second--.

Line 8, delete "seatback" and insert --seatback portion--.

Line 16, delete "seat bar" and insert --seatbar--.

Signed and Sealed this
Twenty-seventh Day of November, 2012

David J. Kappos
*Director of the United States Patent and Trademark Office*